3,167,413
APPARATUS FOR REMOVING CONTAMINATING PARTICLES FROM A GAS STREAM

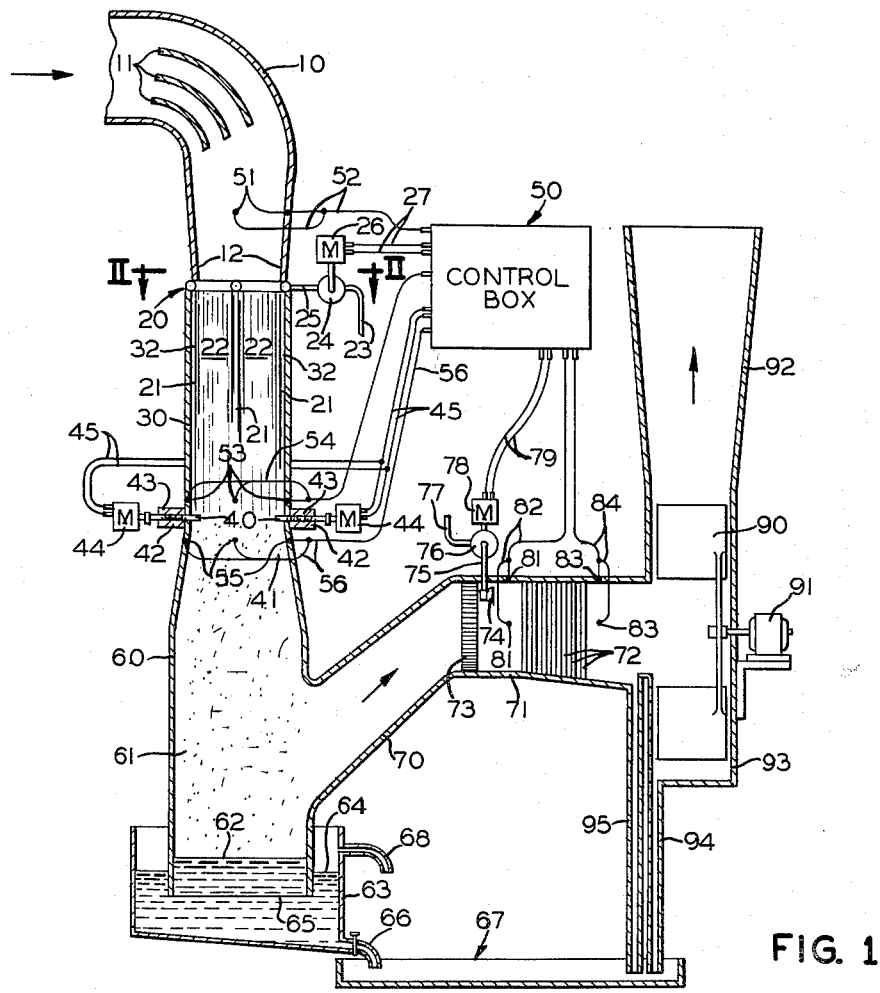
FIG. 1
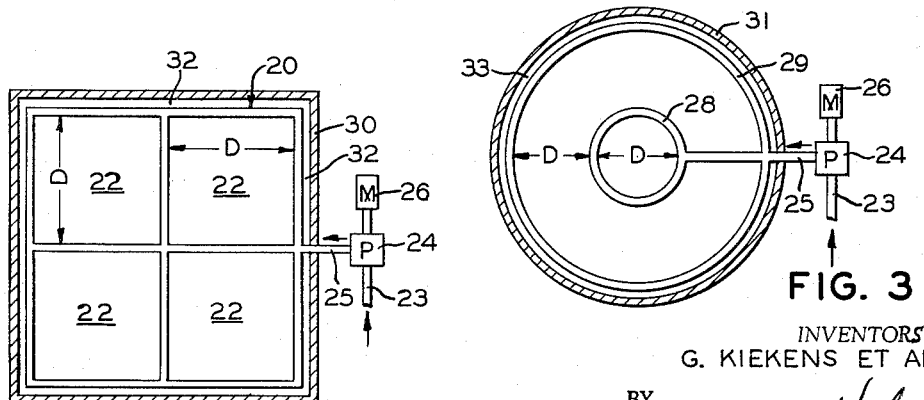
FIG. 2
FIG. 3
INVENTORS
G. KIEKENS ET AL
BY
ATTORNEY

Gerrit Kiekens, Laren, Alfred Sher, Amsterdam, Arend Hubregt de Haas van Dorsser, The Hague, Johannes Gerardus Adrianus de Graaf, Rijswijk, and Dick Zaalberg, The Hague, Netherlands, assignors to Machinefabriek Kiekens N.V. Landsmeer, Netherlands, and Nederlandse Organisatie voor Toegepast-Natuurwetenschappelijk Onderzoek ten behoeve van Nijverheid, Handel en Verkeer, The Hague, Netherlands
Filed Apr. 7, 1960, Ser. No. 20,706
Claims priority, application Germany Apr. 14, 1959
11 Claims. (Cl. 55—225)

This invention relates to an apparatus for removing particles which contaminate a flowing stream of gas. More particularly, it deals with such an apparatus in which the particles in the gas are passed concurrently inside a surrounding freely falling liquid film or curtain until the liquid film is broken up into droplets which will mingle with and adhere to the particles in the gas, and then separating the gas from the liquid containing the contaminated particles.

Previously, wet washers have been used for separating contaminating particles from a gas, which wet washers comprise direct nozzles squirting liquid into a stream of gas to absorb and collide with the particles therein, and then separating the liquid containing the particles. However, such apparatus has the disadvantages of effecting a material loss in pressure in the gas passing through the apparatus, that only one particular type of nozzle is best for one velocity of gas and vice versa, and that increasing the amount of liquid in the spray from the nozzle is limited by the amount of liquid that the separator following the apparatus can remove.

Also previously, Venturi washers have been employed in which a liquid spray is directed into the gas stream perpendicular to the wall of the washer. This apparatus has the disadvantage of effecting a high loss in pressure in the gas and is only effective for a relatively limited range of variations in the velocity of the gas stream.

Accordingly, the problem not solved by the prior art is to obtain an apparatus which has a balance between a minimum pressure loss or drop for the gas passing through the apparatus, and a maximum of percentage of particles removed from the gas for large variations in the amount of contaminant in the gas and/or for large variations in the velocity of the gas. Such large variations in velocity of gas and percentages of contaminations occur, for example, when a furnace door is opened such as for charging thereof, or when the furnace is cleaned, or when a chemical process is being changed, and the gases from such apparatus are to be cleaned.

Accordingly, it is an object of the present invention to produce an apparatus of simple, efficient, effective and economic construction for the purification of gas in a stream, and in particular, a gas stream which contains comparatively widely varying amounts of contaminating particles as well as having comparatively widely varying velocities.

Another object is to produce such an apparatus which has a high percentage of particle removal at various velocities, as well as a low pressure loss or has low resistance to the gas stream passing through the apparatus.

Another object is to control the operation of the apparatus by the variations in pressure drop through the apparatus and to maintain this pressure drop substantially constant and above a predetermined minimum.

Another object is to produce an apparatus which has a relatively constant percentage of particles removal regardless of the percentage of particles in the gas or the velocity of the gas through the apparatus.

Still another object is to produce such an apparatus in which more intimate contact between the liquid sprayed into the apparatus and the contaminated particles is obtained without substantial reduction in the pressure of the gas flowing through the apparatus.

Generally speaking, the apparatus of this invention comprises a spraying frame from which a freely falling continuous curtain of liquid extends to form a tubular channel of between about four inches and eight inches across, through which liquid film surrounded channel the gas containing the contaminated particles is directed. The contaminated gas thus passing this liquid film formed tubular channel causes the liquid film to pull inwardly, according to the Bernoulli effect, until the gas stream breaks up into droplets and mingles with the particles in the gas being passed therethrough. The velocity of the gas stream through this tubular channel of liquid determines how far below the spraying frame, at which the liquid film channel is formed, that this film will break into droplets. Thus according to this invention, pressure sensing means are provided in the stream of gas at points both above and below the region at which the film breaks into droplets and mingles with the particles in the gas, and the pressure drop measured between these points is employed for controlling the amount of liquid introduced through the spraying frame to form the liquid film and/or also for regulating a mechanical rim means which surrounds the tubular channel of liquid at a predetermined distance below the spraying frame, which rim means is movable inwardly and outwardly to aid in positively breaking up the liquid film into said droplets. After the liquid film has been broken up into droplets, the contaminated particles in the gas adhere thereto so that a purified gas can be separated readily from the now particle-contaminated liquid droplets.

In directing the particle-contaminated gas stream downwardly through the spraying frame into continuous tubular channel of liquid film, there may be provided duct means with guides to prevent turbulence in the gas stream. Preferably, the liquid tubular channel is surrounded by a vertical duct means tubular housing, however, this housing is spaced outside of the liquid-film formed-channel, so that the liquid film is freely falling and does not run down the inside walls of this housing. This housing may support the spraying frame inwardly of its upper end and the variable rim means at its lower end or below said spraying frame.

Below the vertical supporting duct or housing there may be provided a separator for the droplets of liquid and the gas, which may comprise a chamber of greater diameter than said housing or liquid-film channel, and from which may extend a branching duct for the gas. This branching duct may conduct the gas for further purification by passage through a drop collector, which collector may be cleaned automatically when the pressure drop across it becomes greater than a predetermined amount. Following the drop collector there may be provided a suction fan for insuring the velocity of the gas through the apparatus, and discharging it into a duct for further use or into the atmosphere.

Thus functionally, this invention comprises an apparatus for maintaining a relatively constant pressure drop in the gas flowing across the mixing rim or through the region wherein the liquid in the freely falling liquid film breaks up into liquid droplets; and it has been found that this pressure drop should be at least above about three eighths (⅜) of an inch of water on a U-type water pressure gauge. By maintaining such constant pressure in a given apparatus, an optimum removal of the contaminating particles is obtained from the gas with a relatively low pressure drop throughout the apparatus, regardless of the changes in the velocity of gas through the apparatus or of the quantity of the contaminating particles in the gas.

The above mentioned and other features and objects of this invention and the manner of attaining them will become more apparent and the invention itself will be best understood by reference to the following description of embodiments of the invention taken in conjunction with the accompanying drawing, wherein:

FIG. 1 is a schematic side elevation, mostly in cross-section, of one embodiment of the apparatus of this invention;

FIG. 2 is a schematic cross-section taken along line II—II of FIG. 1 showing one embodiment of the spraying frame comprising a lattice; and FIG. 3 is a schematic cross-section similar to that shown in FIG. 2, of another embodiment of a spraying frame comprising concentric spray rings.

Referring now to the drawing, there is schematically shown in FIG. 1 one embodiment of this invention in combination with a drop collector means after the drop separator. According to this embodiment, the gas containing the contaminated particles is introduced into the L-duct 10, which may contain vanes 11 for insuring the uniform or non-turbulent flow of the gas to be purified before it is guided or directed downwardly through the outlet 12 into the apparatus of this invention.

The first part of the specific apparatus of this invention comprises a spraying frame 20, which may comprise a square lattice as shown in FIG. 2, from the bottom of which are provided nozzles for producing a continuous freely falling liquid film 21. Below the frame 20 this liquid film forms herein four parallel tubular channels 22 having square cross-sections corresponding to that of the lattice shown in FIG. 2. It is through these liquid-film-defined tubular ducts or channels 22 that the stream of particle-contaminated gas is passed. The liquid may be supplied to the spraying frame 20 from a source of supply thereof connected to duct 23 and thence through a pump 24 and a duct 25 to the frame 20. The pump 24 may be operated by a motor 26 which is controlled through electrical conductors 27 connected to a control box 50. The lower end 12 of the elbow duct 10 is of such a size so that it just fits over the frame 20 so as to insure that all of the contaminated gas passes as smoothly as possible directly and downwardly into the liquid-film-formed tubular ducts or channels 22. It has been found that for optimum results the space between the adjacent films, or across the channels 22, namely the distance "D" shown in FIG. 2, should be at least about four inches and not greater than about eight inches.

If desired, a pair of concentric circular spraying frames 28 and 29 as shown in FIG. 3 may be provided instead of the lattice spraying frame 20 shown in FIGS. 1 and 2, without departing from the scope of this invention. Similarly the radial distances "D" between the freely falling films formed from such concentric circular frames 28 and 29 preferably is between about four and eight inches as for the lattice frame 20.

If desired, the spraying frames 20 or 29 may be supported by a surrounding vertical duct or housing 30 or 31, as respectively shown in FIGS. 2 or 3, which housings may have a shape corresponding to the periphery of the frames 20 or 29, but having an inside diameter sufficiently greater than that of these frames so that the curtain of liquid 21 is a freely fallling film spaced from the walls of said housings, such as by distance 32 shown in FIGS. 1 and 2, and the distance 33 shown between the circular outer ring 29 and housing 31 in FIG. 3.

Mounted on the outside of the housing 30 below the spraying frame 20 there is shown in FIG. 1 a movable rim 40, which may be moved to and fro from a position flush with the inside of the housing 30 inwardly to contact the freely falling curtain or film 21 of liquid to insure that it breaks up into droplets 41 in this region of the housing 30. This rim means 40 may be moved inwardly and outwardly such as by screws 42 mounted in guiding bosses 43 attached to the outside of the housing 30 and driven by means of electric motors 44 which in turn are controlled by electric conductors 45 extending from the motors 44 to the control box 50.

There are also shown pressure sensing conduits or means connected into various regions of both the inlet duct 10 and the housing or duct 30, above and below the spraying frame 20 and rim means 40. For example, above the spraying frame 20 in the duct 10, between its lower periphery or outlet 12 and the guide vanes 11, there is shown sensor openings or apertures 51 in the sides of said duct 10 connected by conduits 52 to the control box 50. Similarly sensors 53 are provided around the housing 30 above the rim means 40, which sensors or openings 53 are connected by conduits 54 to the control box 50. And again sensors or openings 55 are provided around the housing 30 below the rim 40, which openings or sensors 55 are connected by conduits 56 to the control box 50. Thus by measuring the pressure at the different points of the sensors 51 or 53 and 55, pressure drop can be determined in the control box 50 for the gas flowing downwardly through the apparatus, and particularly the drop in pressure of the gas before and after curtain films 21 are broken up into droplets in the region of the mixing rim 40. This measured drop in pressure is employed in the control box 50 for automatically controlling either or both the motors 26 and 44, so as to compensate for variations in the pressure drop and maintain it substantially constant by increasing or decreasing the liquid flowing to the spraying frame 20, and/or extending or retracting the movable rim means 40. Thus variations in the velocity of the gas through the duct 10 as well as variations in the amount of contaminating particles in the gas which effect the pressure drop in the apparatus are automatically compensated for.

Below the mixing rim means 40 and the supporting housing 30 for the freely falling tubular liquid channels 22, is provided a separator comprising a housing 60 having inside dimensions greater than the diameter of housing 30 to provide a droplet removing and gas separating chamber 61 into which the gas and droplets are directly blown. This separator may comprise a liquid level 62 at the open bottom of the chamber 61, which level of liquid therein may be sealed by immersion in an outer container 63 having a liquid level 64 above the bottom edge 65 of the chamber 61. This container 63 may be provided with a lower draining valve or spigot 66 for withdrawing liquid as it accumulates into a drain or trough 67. An overflow spout 68 may also be provided for the container 63 which spout 68 also discharges into the trough 67.

Branching upwardly from one side of the chamber 61 may be provided a gas discharge duct 70 for the gas from which substantially all contaminated particles have been removed. However, there still may be some droplets of liquid in this gas and a droplet separator means may be provided for further purification of this gas. This droplet separator is shown in FIG. 1 to be located in a horizontal duct 71 connected to the outlet of duct 70, which separator may comprise a series of parallel streamlined rods 72 which collect droplets as the gas passes over them. In order to prevent turbulence in the gas stream, there may be provided a guide means such as a honeycomb 73 provided between the outlet of duct 70 and the inlet of duct 71.

Furthermore, in order to prevent too much pressure drop across the droplet separator rods 72, there may be provided a liquid spray 74 projecting in the direction of the gas stream into the duct 71 between the honeycomb 73 and the rods 72 for cleaning the rods 72. The liquid for this spray 74 may be conducted via duct 75 from a pump 76 which receives the liquid from a supply source through duct 77. This pump 76 may be driven by a motor 78 which may be controlled through electrical conductors 79 connected to the control box 50. The operation of this cleaning mechanism 74–79 may be under the control of further pressure sensor openings 81 in the duct 71 before the droplet collector rods 72 and connected by means of conduits 82 to the control box 50, and additional sensors or openings 83 in the duct 71 after the droplet collector rods 72 and connected by conduits 84 to the control box 50. Thus when the pressure drop of the gas between the points of the sensors or openings 81 and 83 becomes greater than a predetermined amount, there may be provided means in the control box 50 for starting the motor 78 to run the pump 76 for cleaning the control rods 72 for a predetermined period of time. Thus with higher velocity and/or the greater percentage of contamination of the gas stream in the apparatus of this invention, the more frequent may be the operation of the cleaning mechanism 74–79.

At the outlet of the duct 71 there may be provided a suction fan 90 driven by a motor 91 for directing the purified gas out through a discharge duct 92. From the bottom of the fan housing 93 and duct 71 there may be provided drain pipes 94 and 95, respectively, extending into the discharge trough 67 for removing any liquid which may reach these pipes from the cleaning spray 74 or fan 90.

Actual tests run in an apparatus similar to that shown in FIGS. 1 and 2 have been made, two of which are described below:

EXAMPLE I

An automatic pressure drop controlled apparatus according to FIG. 1 was constructed having a duct 12 and a lattice frame 20 as shown in FIG. 2 eighteen (18) inches square. Into the duct 10 of this apparatus was introduced a stream of air containing contaminating particles at a velocity of 3500 feet per minute. The mixing rim 40 protruded 1 3/16" from the wall of the housing 30 and was located 3½ feet below the frame 20. The pressure drop over the mixing rim 40 was 7/8 inch on a U-type water gauge and the overall pressure drop through the device from the manometer connections or sensors 51 to the sensors 83 was 3 inches on the water gauge. The contaminating-particle catching percentage was 96.4% for an extremely fine dust having a specific weight of 2.4 to 2.7 grams per cubic centimeter, a particle size according to the following table, and a dust concentration of 0.85 gram per cubic meter. With an increase of the concentration of the dust to 1.04 grams per cubic meter, the percentage of dust or particles removed was maintained substantially at 96.4%. When the concentration of the dust was raised to 2.9 grams per cubic meter, the percentage of removal of particles only fell to 96.1%.

Table

| Particle size in microns, ($\mu$): | Percentage of dust |
|---|---|
| >14.5 | 4.9 |
| 11.7–14.5 | 7.7 |
| 9.7–11.7 | 7.4 |
| 8.3–9.7 | 9.6 |
| 7.3–8.3 | 6.0 |
| 6.5–7.3 | 5.6 |
| 5.9–6.5 | 5.3 |
| 5.3–5.9 | 3.5 |
| 4.8–5.3 | 2.3 |
| 4.5–4.8 | 5.1 |
| 4.2–4.5 | [1] 4.4 |
| 2.9–4.2 | 14.7 |
| 1.95–2.9 | 6.2 |
| <1.95 ($\mu$) | 17.3 |

[1] Accuracy only 6%.

EXAMPLE II

This example was carried out in the same apparatus as described in Example I and shown in FIG. 1, but with an input contaminated air velocity of 1,580 feet per minute, and with the mixing rim 40 protruding 2¾ inches from the walls of the channel 30. Under these conditions, the pressure drop over the mixing rim 40 was still maintained at 7/8 inch on the U-type water gauge. The contaminating particle catching percentage was 96% for dust particles having a specific weight of 1.6 grams per cubic centimeter, a particle size from 3 to 10 microns, and a dust concentration of 3 grams per cubic meter. When the velocity of the air containing these particles was increased to 3,440 feet per minute, the mixing rim was automatically adjusted to protrude only 1 3/16", and under these conditions with the same dust concentration, 96.5% of the particles in the gas were removed. Thus as the different velocities in the liquid passing through the apparatus are detected from the sensors 51, 53, and 55, the control box 50 operates to either increase or decrease the flow of the liquid in the spraying frame 20 and/or extend or retract the mixing rim 40 so as to maintain the pressure drop of the gas stream passing through the apparatus substantially constant.

While there is described above the principles of this invention in connection with specific apparatus, it is to be clearly understood that this description is made only by way of example and not as a limitation to the scope of this invention.

We claim:

1. An apparatus for removing suspended particles contaminating a gas moving through a duct, said apparatus comprising:
    (A) a spraying frame from which a free falling continuous curtain of liquid extends to form a tubular channel of between about four inches and eight inches across,
    (B) duct means for guiding said contaminated gas without turbulence downwardly into the upper end of said channel, whereby the velocity of said gas in said tubular channel of liquid causes said liquid to break up into droplets and mingle with said particles,
    (C) means for sensing the pressure drop of said gas along its path between a point before and a point after the region in which said droplets are formed and mingle with said particles,
    (D) means to regulate the amount of liquid introduced into said spraying frame in accordance with said sensing means for aiding in maintaining said pressure drop relatively constant and at at least about 3/8 inch, water gauge, and
    (E) means below said droplet and particle mingling region to separate said gas from said liquid mingled with said particles.

2. An apparatus for removing suspended particles contaminating a gas moving through a duct, said apparatus comprising:
    (A) a spraying frame from which a freely falling continuous curtain of liquid extends to form a tubular channel of between about four inches and eight inches across,
    (B) duct means for guiding said contaminated gas without turbulence downwardly into the upper end of said channel,
    (C) rim means below said spray frame and around said channel and movable inwardly and outwardly of said channel for breaking said curtain of liquid into droplets to mingle with said particles in said gas passing through said channel,
    (D) means for sensing the pressure drop of said gas along its path between a point before and a point after said rim means,
    (E) means to regulate the movement of said rim means in accordance with said sensing means for maintaining the pressure drop relatively constant and at at least about 3/8 inch, water gauge, and
    (F) means below said droplet and particle mingling region to separate said gas from said liquid mingled with said particles.

3. An apparatus according to claim 2 wherein said duct means contains guiding plates for insuring non-turbulent flow of said gas in the upper end of said channel.

4. An apparatus according to claim 2 wherein said spraying frame comprises a lattice of quadralateral cross-section.

5. An apparatus according to claim 2 wherein said spraying frame comprises concentric rings.

6. An apparatus according to claim 2 wherein said gas separation means below said rim means includes a chamber of greater cross-sectional area than that of said channel.

7. An apparatus according to claim 2 including a droplet collector means connected to said gas separator means.

8. An apparatus according to claim 7 including means for cleaning said droplet collector means.

9. An apparatus according to claim 8 including means for controlling the operation of said cleaning means by means of the pressure drop of the gas stream across said droplet collector means.

10. An apparatus according to claim 2 including a suction fan for drawing said gas through said apparatus.

11. An apparatus for removing substantially all the suspended particles from a moving stream of gas, regardless of the variation in both the amount of particles and the velocity of the gas stream, said apparatus comprising:
(A) a substantially vertical channel,
(B) means for guiding said gas stream without turbulence down through said channel,
(C) a spraying frame in the upper part of said channel for producing a free falling liquid film surrounding said downwardly guided stream of gas in said channel, said film being freely falling and spaced from inside surfaces of the walls of said channel,
(D) means for supplying liquid to said spraying frame,
(E) adjustable rim means located below said spraying frame, said rim means being movable inwardly and outwardly of said channel for controlling the breaking up of said freely falling film into droplets and the mixing of said droplets with the contaminated particles in said stream so that said particles adhere to said droplets,
(F) means for sensing the pressure drop in said channel between a point above the region where said film breaks into said droplets and a point below said region,
(G) means for controlling the liquid supply means and said adjustment of said rim means in response to said pressure drop sensing means to maintain said pressure drop substantially constant regardless of the velocity and amount of contamination of said gas stream, and
(H) means at the bottom of said channel for separating the liquid droplets and said particles adhered thereto from said gas stream.

References Cited in the file of this patent

UNITED STATES PATENTS

| | | |
|---|---|---|
| 441,106 | Monsanto | Nov. 18, 1890 |
| 856,732 | Saaler | June 11, 1907 |
| 1,037,095 | Williams et al. | Aug. 27, 1912 |
| 1,128,177 | Moser | Feb. 9, 1915 |
| 1,222,541 | Donham | Apr. 10, 1917 |
| 1,838,255 | Handelan | Dec. 29, 1931 |
| 1,947,447 | Brassert et al. | Feb. 20, 1934 |
| 2,585,440 | Collins | Feb. 12, 1952 |
| 2,964,304 | Rice | Dec. 13, 1960 |

FOREIGN PATENTS

| | | |
|---|---|---|
| 32,077 | Norway | Apr. 4, 1921 |
| 528,957 | Great Britain | Nov. 11, 1940 |
| 445,322 | Great Britain | Apr. 7, 1936 |